(12) United States Patent
Hamilton et al.

(10) Patent No.: US 8,611,926 B2
(45) Date of Patent: Dec. 17, 2013

(54) METHOD AND A SYSTEM FOR COMMUNICATING INFORMATION TO A LAND SURVEYING ROVER LOCATED IN AN AREA WITHOUT CELLULAR COVERAGE

(71) Applicant: Trimble Navigation Limited, Sunnyvale, CA (US)

(72) Inventors: Jeffrey Allen Hamilton, Westminster, CO (US); Brent O'Meagher, Auckland (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/889,129

(22) Filed: May 7, 2013

(65) Prior Publication Data
US 2013/0244694 A1 Sep. 19, 2013

Related U.S. Application Data

(60) Division of application No. 12/563,825, filed on Sep. 21, 2009, now Pat. No. 8,497,800, which is a continuation-in-part of application No. 11/364,958, filed on Feb. 28, 2006, now Pat. No. 7,613,468, which is a continuation-in-part of application No. 10/666,079, filed on Sep. 19, 2003, now Pat. No. 7,480,511.

(51) Int. Cl.
*H04B 7/185* (2006.01)

(52) U.S. Cl.
USPC .................................. 455/456.1; 342/357.03

(58) Field of Classification Search
USPC .......................................... 455/456; 342/357
See application file for complete search history.

(56) References Cited

U.S. PATENT DOCUMENTS

| | | | |
|---|---|---|---|
| 4,187,398 | A | 2/1980 | Stark |
| 5,841,026 | A | 11/1998 | Kirk et al. |
| 5,928,306 | A | 7/1999 | France et al. |
| 6,249,245 | B1 | 6/2001 | Watters et al. |
| 6,317,603 | B1 | 11/2001 | Allison |

(Continued)

FOREIGN PATENT DOCUMENTS

WO   WO 01/50151 A1   7/2001

OTHER PUBLICATIONS

Non-Final Office Action Response, U.S. Appl. No. 10/867,861, May 23, 2008, 7 pages.

(Continued)

*Primary Examiner* — Marcos Batista
*Assistant Examiner* — Frank Donado

(57) ABSTRACT

In a method for requesting network-derived position data from a mobile geographic position aware receiver, a mobile geographic position aware receiver having a first IP address is communicatively coupled with a first port on a router. A wireless transceiver is communicatively coupled with a second port on the router. A wireless communication device is communicatively coupled with a third port on the router. A processor is communicatively coupled with the router; the processor for executing a communications access command sequence. The command sequence comprises: testing for a wireless network connectivity; contacting a source of position data if wireless network connectivity exists; and generating a data message to be sent via the wireless transceiver if the wireless network connectivity does not exist, the data message comprising an Internet Protocol (IP) address of the router, an approximate current location of the mobile geographic position aware receiver, and a request for correction data.

13 Claims, 10 Drawing Sheets

(56) References Cited

U.S. PATENT DOCUMENTS

| | | | |
|---|---|---|---|
| 6,324,473 B1 | 11/2001 | Eschenbach | |
| 6,370,475 B1 | 4/2002 | Breed et al. | |
| 6,397,147 B1 | 5/2002 | Whitehead | |
| 6,469,663 B1 | 10/2002 | Whitehead et al. | |
| 6,473,032 B1 | 10/2002 | Trimble | |
| 6,529,830 B1 | 3/2003 | Eschenbach | |
| 6,567,041 B1* | 5/2003 | O'Dell | 342/357.44 |
| 6,584,095 B1 | 6/2003 | Jacobi et al. | |
| 6,597,311 B2 | 7/2003 | Sheynblat et al. | |
| 6,677,894 B2 | 1/2004 | Sheynblat et al. | |
| 6,741,935 B1 | 5/2004 | Eschenbach | |
| 7,035,650 B1 | 4/2006 | Moskowitz et al. | |
| 7,050,815 B2* | 5/2006 | I'Anson et al. | 455/456.1 |
| 7,110,880 B2 | 9/2006 | Breed et al. | |
| 7,187,931 B2 | 3/2007 | Trossen | |
| 7,313,628 B2 | 12/2007 | Chaskar et al. | |
| 7,336,641 B2 | 2/2008 | Kim et al. | |
| 7,362,265 B2 | 4/2008 | Weill | |
| 7,474,896 B2 | 1/2009 | Mohi et al. | |
| 7,480,511 B2 | 1/2009 | O'Meagher | |
| 7,590,720 B2 | 9/2009 | Bahl | |
| 7,613,468 B2 | 11/2009 | Hamilton et al. | |
| 7,630,340 B2 | 12/2009 | Jung et al. | |
| 7,711,480 B2 | 5/2010 | Robbins | |
| 7,751,829 B2 | 7/2010 | Masuoka et al. | |
| 7,756,636 B2 | 7/2010 | Kikuchi et al. | |
| 7,911,379 B2 | 3/2011 | Cameron | |
| 7,957,748 B2 | 6/2011 | Heater et al. | |
| 7,961,717 B2 | 6/2011 | Lee et al. | |
| 8,014,945 B2 | 9/2011 | Cooper et al. | |
| 8,023,963 B2 | 9/2011 | Yonker et al. | |
| 8,032,300 B2 | 10/2011 | Nadkarni | |
| 8,073,461 B2 | 12/2011 | Altman et al. | |
| 8,085,195 B2 | 12/2011 | Abraham | |
| 8,103,430 B2 | 1/2012 | Aliakbarzadeh | |
| 8,103,438 B2 | 1/2012 | Petrie et al. | |
| 8,311,526 B2 | 11/2012 | Forstall et al. | |
| 8,437,693 B2 | 5/2013 | Brown et al. | |
| 2003/0025632 A1 | 2/2003 | Sheynblat et al. | |
| 2003/0055666 A1 | 3/2003 | Roddy et al. | |
| 2003/0195008 A1 | 10/2003 | Mohi et al. | |
| 2004/0006424 A1 | 1/2004 | Joyce et al. | |
| 2004/0096041 A1 | 5/2004 | Beckmann et al. | |
| 2004/0151152 A1 | 8/2004 | Kim et al. | |
| 2004/0166861 A1 | 8/2004 | Trossen | |
| 2005/0010361 A1 | 1/2005 | Runkel et al. | |
| 2005/0064878 A1 | 3/2005 | O'Meagher | |
| 2005/0136845 A1 | 6/2005 | Masuoka et al. | |
| 2005/0137786 A1 | 6/2005 | Breed et al. | |
| 2006/0029020 A1 | 2/2006 | Jung et al. | |
| 2006/0064244 A1* | 3/2006 | Robbins | 701/214 |
| 2006/0149466 A1 | 7/2006 | Kikuchi et al. | |
| 2006/0227047 A1 | 10/2006 | Rosenberg | |
| 2006/0271290 A1 | 11/2006 | Li | |
| 2007/0005244 A1 | 1/2007 | Nadkarni | |
| 2007/0030841 A1 | 2/2007 | Lee et al. | |
| 2007/0060097 A1 | 3/2007 | Edge et al. | |
| 2007/0066322 A1 | 3/2007 | Bahl | |
| 2007/0200755 A1 | 8/2007 | Hamilton et al. | |
| 2008/0132251 A1 | 6/2008 | Altman et al. | |
| 2008/0248813 A1 | 10/2008 | Chatterjee | |
| 2008/0268870 A1 | 10/2008 | Houri | |
| 2008/0309550 A1* | 12/2008 | Sairo et al. | 342/357.1 |
| 2009/0005021 A1 | 1/2009 | Forstall et al. | |
| 2009/0082949 A1 | 3/2009 | Petrie et al. | |
| 2009/0104919 A1 | 4/2009 | Heater et al. | |
| 2009/0143079 A1 | 6/2009 | Klassen et al. | |
| 2009/0186628 A1 | 7/2009 | Yonker et al. | |
| 2009/0197617 A1 | 8/2009 | Jayanthi | |
| 2010/0029302 A1 | 2/2010 | Lee et al. | |
| 2010/0069035 A1 | 3/2010 | Johnson | |
| 2010/0075643 A1 | 3/2010 | Cooper et al. | |
| 2010/0182196 A1 | 7/2010 | Abraham | |
| 2010/0216491 A1 | 8/2010 | Winkler et al. | |
| 2011/0183606 A1 | 7/2011 | Brown et al. | |

OTHER PUBLICATIONS

Hada, Hisakazu et al., "DGPS and RTK Positioning Using the Internet", GPS Solutions, Springer, Berlin. DE, vol. 4, No. 1, Jul. 1, 2000, 34-44.

Intuicom, "RTK Bridge-C", www.intuicom.com/www/datasheets/RTKBridgeC_Dec2009.pdf, Dec. 2009, 2 pages.

Intuicom Inc. "Intuicom RTK Bridge Press Release", www.intuicom.com/www/RTK/rtkBridge.htm, 1 page.

Intuicom Inc. "RTK Bridge-E", http://www.intuicom.com/www/datasheets/RTKBridgeE.pdf, Dec. 2009, 2 pages.

Landau, Herbert et al., "Virtual Reference Station Systems", Journal of Global Positioning Systems, International Association of Chinese Professionals in Global Positioning Systems, Sydney; AU, vol. 1, No. 2, 2002, 137-143.

* cited by examiner

1000

RECEIVING A REQUEST FOR THE LOCATION-SPECIFIC DATA FROM A MOBILE GEOGRAPHIC POSITION AWARE RECEIVER, THE REQUEST CONVEYING AN INTERNET PROTOCOL (IP) ADDRESS WHICH IDENTIFIES A FIRST ROUTER ASSOCIATED WITH THE MOBILE GEOGRAPHIC POSITION AWARE RECEIVER AND AN APPROXIMATE CURRENT LOCATION OF THE MOBILE GEOGRAPHIC POSITION AWARE RECEIVER.
1002

PREPARING LOCATION-SPECIFIC DATA FROM AT LEAST ONE REFERENCE SOURCE BASED ON THE APPROXIMATE CURRENT LOCATION OF THE MOBILE GEOGRAPHIC POSITION AWARE RECEIVER.
1004

SENDING THE LOCATION-SPECIFIC DATA IN A DATA MESSAGE TO THE SPECIFIC IP ADDRESS
1006

FIG. 10

METHOD AND A SYSTEM FOR COMMUNICATING INFORMATION TO A LAND SURVEYING ROVER LOCATED IN AN AREA WITHOUT CELLULAR COVERAGE

CROSS REFERENCE TO RELATED U.S. APPLICATIONS

This application is a divisional application of and claims the benefit of co-pending U.S. patent application Ser. No. 12/563,825, filed on Sep. 21, 2009, entitled "A Method and a System for Communicating Information to a Land Surveying Rover Located in an Area Without Cellular Coverage," by Jeffrey Hamilton and Brent O'Meagher, assigned to the assignee of the present application, which is herein incorporated by reference in its entirety.

U.S. patent application Ser. No. 12/563,825 was a continuation-in-part of and claimed priority to and benefit of then co-pending U.S. patent application Ser. No. 11/364,958 (now U.S. Pat. No. 7,613,468), entitled "A Method and a System for Communicating Information to a Land Surveying Rover Located in an Area Without Cellular Coverage" by Jeffrey Hamilton and Brent O'Meagher, assigned to the assignee of the present application, with the filing date of Feb. 28, 2006, which is herein incorporated by reference in its entirety. U.S. patent application Ser. No. 11/364,958 was a continuation-in-part of and incorporated by reference U.S. patent application Ser. No. 10/666,079 (now U.S. Pat. No. 7,480,511), filed Sep. 19, 2003, titled "A Method and System for Delivering Virtual Reference Station Data," by Brent O'Meagher, and assigned to the assignee of the present invention.

TECHNICAL FIELD

Embodiments of the present invention relate to land surveying. More specifically, embodiments of the present invention relate to providing communications to apparatuses located in areas that do not have cellular coverage.

BACKGROUND ART

Land surveying companies and earth moving companies use rovers that can move around to survey areas of land or to move earth for various reasons. Rovers can be associated with many types of earth-moving machinery such as bulldozers, graders, and the like. In order to perform the Real Time Kinematic survey process, the rovers must receive data from at least one GNSS/GPS reference station, usually via a radio link. Modern methods now make use of a plurality of such reference stations, whose data is brought together for further processing at a particular processing center, or Network corrections control center. The rovers communicate with a control center to obtain correction data derived from the plurality of reference stations, as described in U.S. Pat. No. 5,477,458, hereby incorporated by reference in its entirety herein. The networked corrections process has evolved to the point where the accuracy available at a rover is now similar to what is obtained at a single GNSS/GPS reference station. Hence the term "Virtual Reference Station" has come to apply to a rover receiver operating with networked corrections from a plurality of GNSS/GPS reference stations.

Networked corrections may be delivered to a particular rover via a cellular connection, or, if sufficiently close to a control center, via radio broadcasting method. However, cellular communication is not available in many parts of the world, particularly where infrastructure development is underway, as in many construction projects which require surveying or earthmoving activities, and traditional radio broadcasting methods have limited range. Thus there is a need for an improved communications path from rover to a networked corrections control center.

DISCLOSURE OF THE INVENTION

Embodiments of the present invention pertain to methods and systems for communicating information to a roving positioning device located in an area without cellular coverage. In one embodiment, a cellular communication device, a non-cellular wireless communication device, and a computer networking device for forwarding data packets are coupled with a bus. A request originating from a roving positioning device for a location-specific position correction is received via the non-cellular wireless communication device. A controller coupled with the bus causes the request to be forwarded via the cellular communication device.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

FIG. 10 is a flowchart of a method for delivering location-specific data from a source of location-specific data in accordance with embodiments of the present invention.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Communications System in Accordance with Embodiments of the Present Invention

Figure 1:
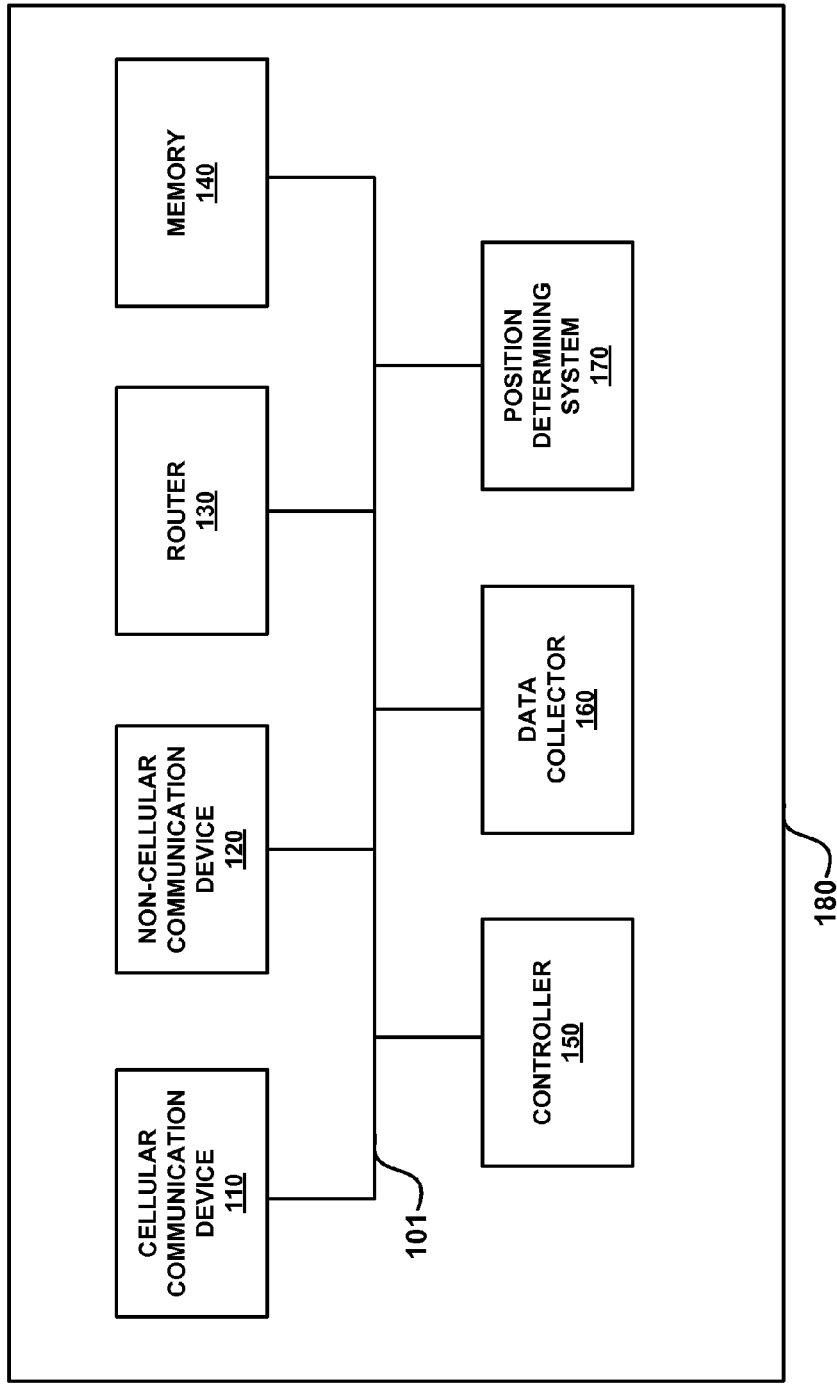
FIG. 1 is a block diagram of a router for communicating information to a land surveying rover located in an area without cellular coverage, according to one embodiment of the present invention.

FIG. 1 is a block diagram of an exemplary system 100 for communicating information to a land surveying rover located in an area without cellular coverage, according to embodiments of the present invention. It is noted that the blocks in FIG. 1 can be arranged differently than as illustrated, and can implement additional or fewer features than what are described herein. Further, the features represented by the blocks in FIG. 1 can be combined in various ways. It is noted that in embodiments of the present invention, system 100 may be a rover. A rover is mobile device and typically has a GPS receiver, or another type of position determining system. Rovers are typically used by land surveying and earth moving companies. A rover can be a device that a human can physically carry around as a surveying instrument. Alternatively, a rover can be associated with heavy equipment such as a bulldozer or a grader.

As depicted in FIG. 1, the system 100 includes a cellular communication device 110 and a non-cellular communications device 120 which are communicatively coupled via a bus 101. The cellular communications device 110 can use Internet protocols, such as Transmission Control Protocol/Internet Protocol (TCPIP), packet switching, Institute of Electronic and Electronics Engineers (IEEE) 802.11 standard, Wireless Local Area Network (Wi Lan), IEEE 802.16 standard (also commonly known as "WiMax"), and general packet radio service (GPRS), among other things. The cellular communications device 110 can use standards-based mobile internet protocols (IP) to provide interoperability between networks, while allowing for future network expansions and upgrades. Cellular communications device 110 may be used to communicate with a RTK control center in embodiments of the present invention.

In embodiments of the present invention, the non-cellular communications device 120 is a two-way radio. Non-cellular communication device 120 can use spread spectrum, ultra high frequency (UHF), 450 megahertz, 35 megahertz, 900 megahertz, 2.4 gigahertz (GHz), and 5.8 gigahertz, radio frequencies. Non-cellular communications device 120 typically uses a part of the radio spectrum that is allocated by the FCC on an unlicensed basis, such as 900 megahertz, 2.4 GHz, or 5.8 GHz, but is not limited to unlicensed radio frequencies alone. According to a preferred embodiment, non-cellular communication device 120 uses 2.4 gigahertz. Further non-cellular communications device 120 can use time division multiple access (TDMA) broadcast methods well known in the arts.

Typically, cellular communications devices can communicate further distances and at higher baud rates than non-cellular communications devices. However, a non-cellular communication device is more rugged and less expensive than cellular communications device. Further, non-cellular communications device can be used practically any where in the world while cellular communications devices are limited by their coverage areas. By using cellular communications between a first rover and the control center, and non-cellular communications between the first rover and other rovers, the rovers without cellular coverage and the control center can communicate far distances. Further, money can be saved by associating non-cellular communications devices with most of the rovers, or by only using one cellular communication device to forward position requests and corrections.

In the embodiment of FIG. 1, system 100 further comprises a router 130 which is coupled with bus 101. In embodiments of the present invention, router 130 is for establishing data communications with other rovers within range of one another using non-cellular communications device 120. As will be explained in greater detail below, router 130 permits a rover to receive GPS position data from a control center, even when the rover is outside of a cellular communications network coverage area. In embodiments of the present invention, router may be implemented with software, firmware, hardware, or with a combination thereof.

Typically, each rover has a unique identifier, such as an Internet protocol (IP) address. The unique identifier can be stored in memory (e.g., 140 of FIG. 1) associated with the rover, or in an internal memory of router 130. The rovers can use these unique identifiers to identify each other for the purposes of communicating. Normal IP addressing schemes can be used for communicating between the rovers and between a router and a control center. An example of using wireless Internet to distribute GPS information in accordance with embodiments of the present invention is described in U.S. Pat. No. 6,324,473, entitled "Method and Apparatus for Collecting, Processing, and Distributing Differential Global Positioning System Information Using the Internet," by Ralph Eschenbach, assigned to the assignee of the present invention and incorporated as reference herein in its entirety.

As will be described in greater detail below, system 100 may be used in conjunction with rovers which are not equipped with cellular communications devices. For example, system 100 may be emplaced in an area having cellular coverage and be used to forward messages to the control center from a rover that does not have a cellular connection.

Memory 140 is for storing data and instructions for system 100. In one embodiment, memory 140 may comprise a volatile memory such as RAM. It is noted that system 100 may comprise other data storage devices which are not shown in FIG. 1 for clarity. For example, system 100 may also comprise non-volatile memory (e.g., flash memory or ROM), a data display, removable data storage, or a combination thereof.

In the embodiment of FIG. 1, system 100 further comprises a controller 150. Controller 150 is for processing information and instructions. Additionally, controller 150 is for coordinating communications for system 100 using either or both of cellular communication device 110 and non-cellular communication device 120.

In the embodiment of FIG. 1, system 100 further comprises a data collector 160. Data collector 160, according to one embodiment, is a computer system, such as a personal data assistant (PDA), that can be used to enter data into the system 100 or to process the data, or a combination thereof. For example, the data collector 160 can receive and store a description of what system 100 is being used for, such as a specific location or a construction site. In another example, the data collector 160 can be used to receive and store a unique identifier of the system 100.

In the embodiment of FIG. 1, system 100 further comprises a position determining system 170 which is coupled with bus 101. Position determining system 170 determines the geographic position of a rover (e.g., system 100). For the purposes of the present invention, the term "geographic position" means the determining in at least two dimensions (e.g., latitude and longitude), the location of system 100. In one embodiment of the present invention, position determining system 170 is a satellite based position determining system and receives navigation data from satellites via an antenna (not shown). Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the Global Navigation Satellite System (GNSS), the Global Orbiting Navigation Satellite System (GLONASS), Compass/Beidu, or the Galileo system currently under development.

According to one embodiment, a flexible, compact form factor may used for system 100 which may include a rugged enclosure 180. The rugged enclosure is designed so that the system can withstand harsh environments due to high temperature variations, high altitude, shocks, vibrations, and exposure to damp or dusty environments. Further the rugged enclosure enables the system 100 to be used in a moving vehicle. Instead of using an internal fan, the system 100 may utilize a conductive cooling system in the sealed enclosure 180.

Figure 2:
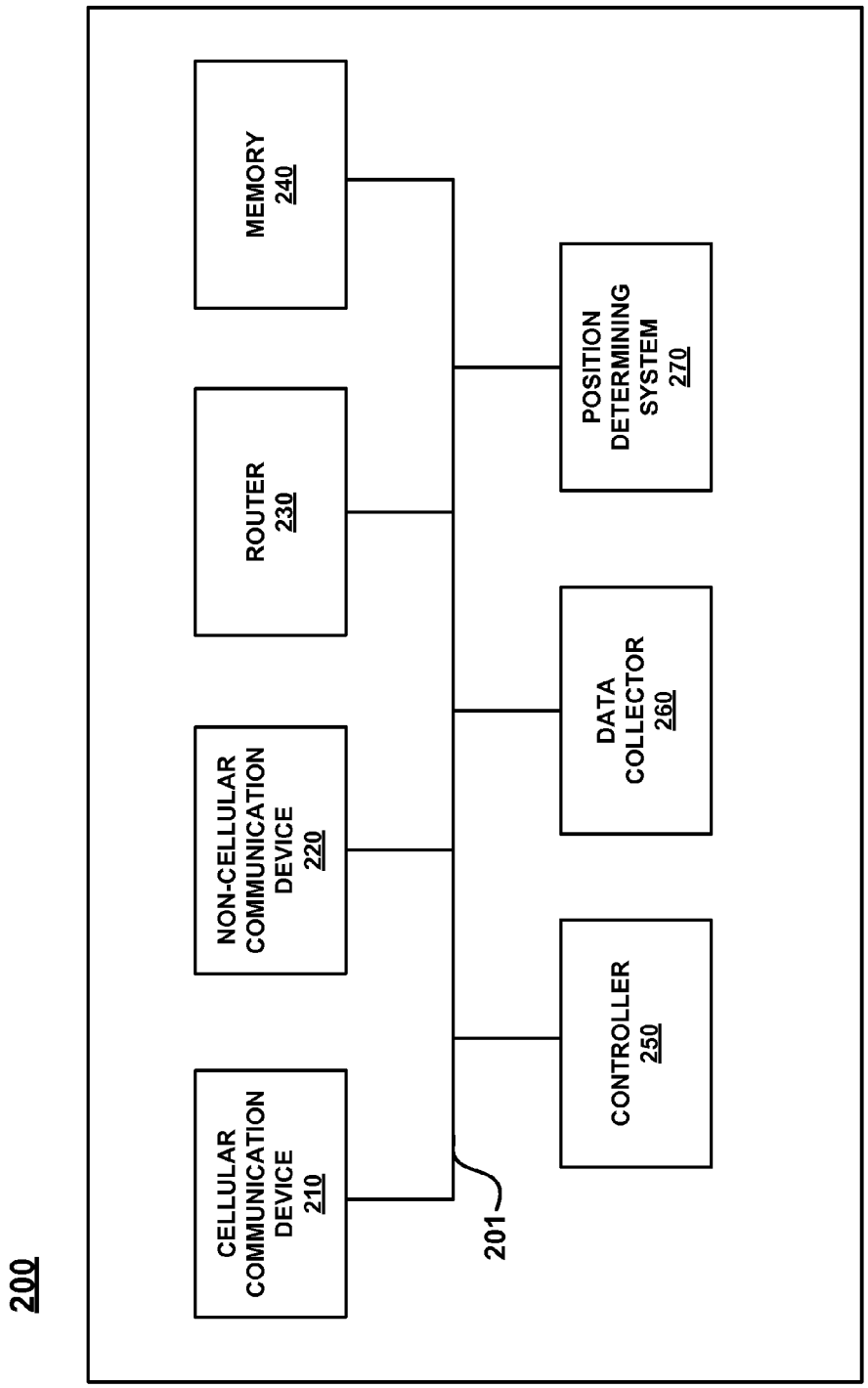
FIG. 2 is a block diagram of a router for communicating information to a land surveying rover located in an area without cellular coverage, according to another embodiment of the present invention.

FIG. 2 is a block diagram of an exemplary system 200 for communicating information to a land surveying rover located in an area without cellular coverage, according to embodiments of the present invention. In the embodiment of FIG. 2, system 200 comprises a cellular communications device 210, a non-cellular communications device 220, a memory 240, a controller 250, a data collector 260, and a position determining system 270 which are communicatively coupled via a bus 201 and which are similar to the devices described above with reference to FIG. 1. In the embodiment of FIG. 2, the router (e.g., router 130 of FIG. 1) has been replaced with a bridge 230. In embodiments of the present invention, a router may not be necessary if all of the routers which are communicating with system 200 all have the same subnet mask. For example, a bridge with a "cut-through" feature allows for fast forwarding of received packets in 64 bit sections without the error checking or control steps typically implemented by a router. As a result, data throughput by bridge 230 may be appreciable faster than if router 130 is used.

Overview of Position Determining Systems Used in Embodiments of the Present Invention Differential GPS Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemeredes). The reference station receives essentially the same GPS signals as rovers which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference between the received GPS signals and what they optimally should be is used as an error correction factor for other GPS receivers in the area. Typically, the reference station broadcasts the error correction to, for example, a rover which uses this data to determine its position more precisely. Alternatively, the error corrections may be stored for later retrieval and correction via post-processing techniques.

Real Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the rovers in the area. Measurements of GPS signal errors taken at the reference station (e.g., dual-frequency code and carrier phase signal errors) and broadcast to one or more rovers working in the area. The rover(s) combine the reference station data with locally collected position measurements to estimate local carrier-phase ambiguities, thus allowing a more precise determination of the rovers position. The RTK method is different from DGPS methods in that the vector from a reference station to a rover is determined (e.g., using the double differences method). In DGPS methods, reference stations are used to calculate the changes needed in each pseudorange for a given satellite in view of the reference station, and the rover, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to rover receiver, or pseudo range) changes significantly for separation distances beyond 70 km. This is because the ionosphere is typically not homogeneous in its density of electrons, and because the electron density may change based on, for example, the sun's position and therefore time of day. Thus for surveying or other positioning systems which must work over larger regions, the surveyor must either place additional base stations in the regions of interest, or move his base stations from place to place. This range limitation has led to the development of more complex enhancements that have superceded the normal RTK operations described above, and in some cases eliminated the need for a base station GPS receiver altogether. This enhancement is referred to as the "Network RTK" or "Virtual Reference Station" (VRS) system and method.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network. The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the rover with the means to estimate the ionospheric path delay from each satellite in view from the rover, and to take account other error contributions for those same satellites at the current instant in time for the rover's location.

The rover is configured to couple a data-capable cellular telephone to its internal signal processing system. The surveyor operating the rover determines that he needs to activate the VRS process and initiates a call to the control center to make a connection with the processing computer. The rover sends its approximate position, based on raw GPS data from the satellites in view without any corrections, to the control center. Typically, this approximate position is accurate to approximately 4-7 meters. The surveyor then requests a set of "modelled observables" for the specific location of the rover. The control center performs a series of calculations and creates a set of correction models that provide the rover with the means to estimate the ionospheric path delay from each satellite in view from the rover, and to take into account other error contributions for those same satellites at the current instant in time for the rover's location. In other words, the corrections for a specific rover at a specific location are determined on command by the central processor at the control center and a corrected data stream is sent from the control center to the rover. Alternatively, the control center may instead send atmospheric and ephemeris corrections to the rover which then uses that information to determine its position more precisely.

These corrections are now sufficiently precise that the high performance position accuracy standard of 2-3 cm may be determined, in real time, for any arbitrary rover position. Thus the GPS rover's raw GPS data fix can be corrected to a degree that makes it behave as if it were a surveyed reference location; hence the terminology "virtual reference station." An example of a network RTK system in accordance with embodiments of the present invention is described in U.S. Pat. No. 5,899,957, entitled "Carrier Phase Differential GPS Corrections Network," by Peter Loomis, assigned to the assignee of the present invention and incorporated as reference herein in its entirety.

The Virtual Reference Station method extends the allowable distance from any reference station to the rovers. Reference stations may now be located hundreds of miles apart, and corrections can be generated for any point within an area surrounded by reference stations. However, there are many construction projects where cellular coverage is not available over the entire physical area under construction and survey.

Figure 3:
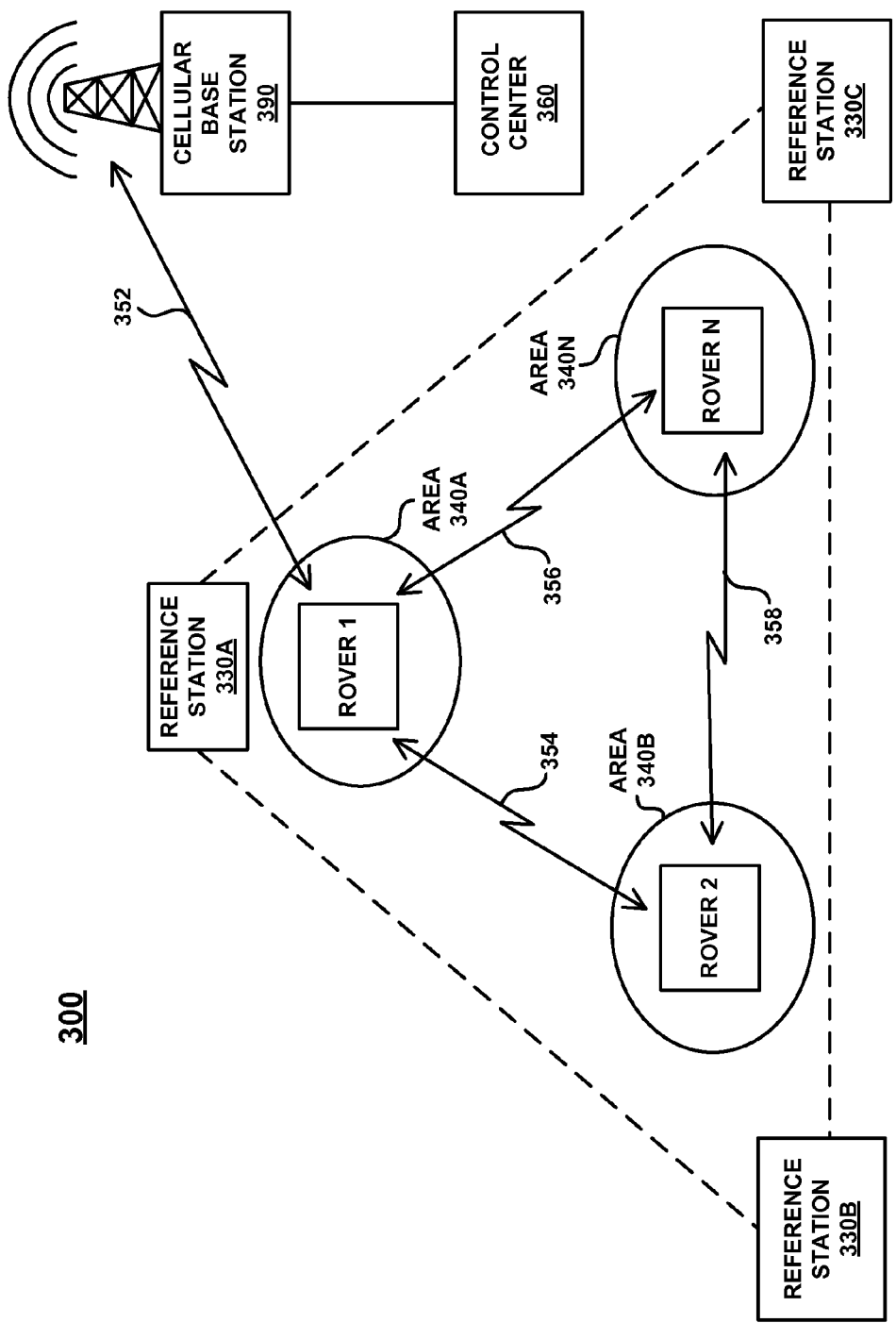
FIG. 3 is a block diagram of a system with a rover that a router is associated with for communicating information to other rovers that are located in an area without cellular coverage, according to one embodiment of the present invention.

System for Communicating Information to a Land Surveying Rover Located in an Area without Cellular Coverage FIG. 3 depicts a block diagram of a system 300 for communicating information to rovers that are located in an area without cellular coverage in accordance with embodiments of the present invention. It is noted that the blocks in FIG. 3 can be arranged differently than as illustrated, and can implement additional or fewer features than what are described herein. Further, the features represented by the blocks in FIG. 3 can be combined in various ways.

As depicted in FIG. 3, system 300 comprises a control center 360 which is communicatively coupled with three reference stations 330A, 330B, 330C. A first rover (e.g., system 100 or system 200) comprising router 130 is located in an area 340A that has cellular communications and therefore can use cellular communication connection 352 to communicate with the control center 360 via a cellular base station 390. Rovers 2-N are located respectively in areas 340B-340N that do not provide cellular communications and are equipped with routers 130B and 130N as described above with reference to FIG. 1. Rovers 1-N can use their respective non-cellular communications devices to communicate with each other as depicted by non-cellular communication connections 354 and 356. Furthermore, rover 2 and rover N may communicate via non-cellular communication connection 358. The GPS antennas of reference stations 330A, 330B, and 330C can communicate with GPS/GNS satellites (not shown). Since the locations of the satellites are known in relation to the reference stations 330A, 330B, 330C, the delay path of a GPS signal passing through the ionosphere and troposphere at each of these locations can be determined. The control center 360 can analyze this information and use this information to generate a correction model (also referred to herein as "location specific position correction") based upon the location information that a rover provided to the control center 360.

In embodiments of the present invention, if a rover (e.g., rover 2) determines that it does not have a cellular communication capability, it can make a data connection, using its respective non-cellular communications device 120, with a cellular enabled rover (e.g., rover 1). Rover 2 may not have cellular capability due to, for example, being outside of a cellular coverage area, or because its respective cellular communication device 110 is not enabled. Thus, if rover 2 determines that it cannot communicate with control center 360 using cellular communication device 110, router 130B of rover 2 may be configured to attempt to make a data connection with router 130 of rover 1 whose IP address is pre-configured in the memory of router 130B. Router 130B establishes contact with router 130 and indicates that it is trying to establish a connection with control center 360 via cellular connection 352. The approximate location of rover 2 is forwarded via the data protocol of routers 130 and 130B and is then forwarded to the control center 360. This is typically done via normal IP addressing schemes wherein the router 130 receives data packets from router 130B which are destined for the control center 360.

Control center 360 activates its internal process for determining location-specific "modelled observables" which are appropriate for the approximate location sent by rover 2 as described above. The modelled observables are sent back to rover 1 via cellular connection 352. Router 130 of rover 1 checks the destination address for the data, determines that it is destined for router 130B of rover 2, and forwards the data via non-cellular connection 354. Typically, the data is broadcast into the ether, whereupon it is received by all comparably equipped rover/routers in the general vicinity, but is accepted only by rover 2 due to its unique IP address.

In another embodiment, if rover N does not have a direct non-cellular communication connection with rover 1 (e.g., non-cellular communication connection 356 does not exist due to terrain masking of the signal), it can forward its approximate location and request for a position correction to rover 1 via rover 2. In a similar manner to that described above, router 130N of rover N may have the IP address of router 130B, and router 130 of rover 1, stored in its memory and will communicated with rover 2 via non-cellular communication connection 358 in order to send and receive data to/from control center 360. Upon receiving the data from rover N, rover 2 will attempt to communicate with control center 360 as described above. When the modelled observables are broadcast by rover 1, router 1130B will examine the destination IP address of the data packets and automatically forward them to router 130N by re-broadcasting the data. It is noted that while the examples above specifically teach the use of a router in rover 1, rover 2, and rover N, embodiments of the present invention may utilize a bridge in a similar capacity. For example, if rover 2 and rover N are in the same sub-network, the use of bridges may be appropriate. However, if rover 2 and rover N are configured to operate in separate networks, the use of a router is preferred.

Coordinating Information from Rovers

According to one embodiment, the information that the rovers 1-N provide to control center 360 may be coordinated. For example, the control center 360 can correct the location information that the rovers 1-N provided using various models that are well known in the art and store the corrected location information in a database. Since a lot of information from a plurality of rovers is available, better surveying capabilities can be provided.

More specifically, rover 2 may be equipped with a geodata quality antenna. The rover can remain stationary for approximately 180 seconds while gathering information. The rover 2 can indicate to the control center 360 when it is sitting still, or when it is moving. Rover 1 can communicate the gathered information to the control center 360 using cellular communications device 110. In this case, the control center 360 can provide better ionospheric and tropospheric modeling by accessing more information from a plurality of rovers.

Construction Site Management

Earth moving equipment such as bulldozers and graders are used to prepare a site for construction. In the conventional art, a construction site may have stacks in the ground that indicate how deep the earth movers are to cut. The earth movers have GPS receivers that can receive positioning information from satellites. The positioning information is used for creating a three dimensional (3D) design of what the finished ground is supposed to look like. The finished ground is commonly referred to as a "rough grade." The earth movers use the positioning information to determine where the tip of the blade should be. The positioning information simplifies the job of an earth mover operator so that the operator only has to go backwards, forwards, right and left, but does not have to position the blade. This is commonly referred to as "stackless grade control" because it enables the operator to grade without stacks.

Since bulldozers are expensive, it would not make economic sense to make all of the earth movers rely on cellular communications devices which are more prone to communications failures than radios. Additionally, the cost associated with multiple cellular devices operating from one site can be prohibitive, especially, if fewer cellular devices are capable of handling all of the data being sent. In the conventional art, the earth moving equipment use radios to communicate. This only enables the earth moving equipment to communicate approximately 30 kilometers. According to one embodiment of the present invention, one of the earth movers is equipped with a rover (e.g., system 100 or 200) having a cellular communication connection with a control center. The earth mover with the cellular connection can thus communicate with the control station on behalf of the other earth movers which may be outside of the cellular coverage area, or may simply have their cellular communication devices disabled. The earth movers can communicate their locations to the control center 360 via the router 130, according to embodiments described herein. The control center 360 can use the locations that the earth movers provided to generate virtual reference stations for the earth movers, as described herein. The control center 360 can communicate the position correction data to the earth movers through the router 100, according to embodiments described herein.

According to another embodiment, the control center 360 can coordinate the activities of the earth movers on a site. For example, the earth movers can communicate various types of information about the work, such as measurements, they are doing back to the control center 360. The earth movers can use a common interface for communicating information to the control center 360. Further, the control center 360 can use the same job file for all of the earth movers. The control center 360 can use this information to coordinate the activities of the earth movers. For example, the control center 360 can provide each of the earth movers with information about other earth movers on the site.

Figure 4:
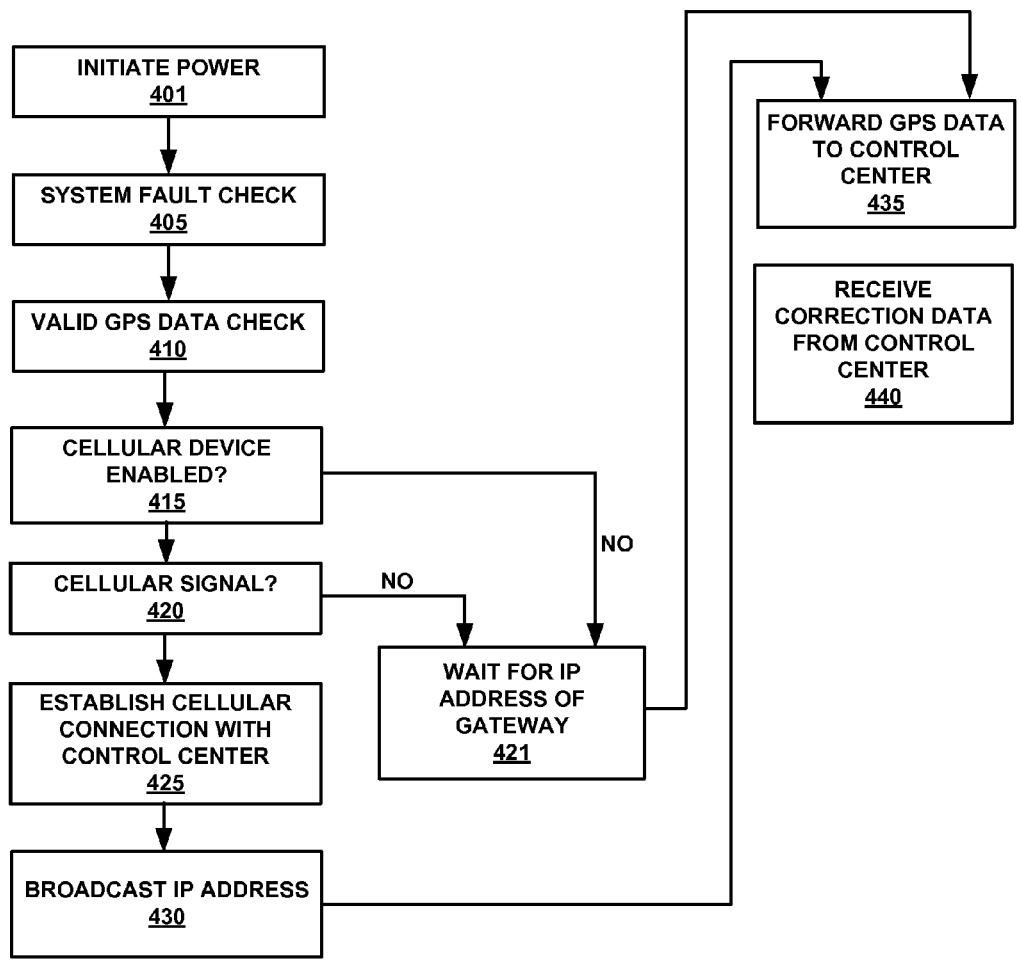
FIG. 4 is a flowchart of a method for establishing communication between a rover and a control center in accordance with embodiments of the present invention.

FIG. 4 is a flowchart of a method 400 for establishing communication between a rover and a control center in accordance with embodiments of the present invention. It is noted that, in one embodiment, method 400 is performed by the controller (e.g., 150 of FIG. 1) of each rover in a network. It is further noted that while the following discussion is directed to system 100 of FIG. 1, method 400 is also applicable to system 200 of FIG. 2.

In step 401 power is initiated for system 100 and method 400 proceeds to step 405.

In step 405 of FIG. 4, an operation is performed to determine whether a system fault error has been received. In embodiments of the present invention, device polling may be performed to determine if a system error condition exists with a component of system 100 or system 200. In other embodiments, each component may independently generate a message to controller 150 conveying that a system error has occurred. It is noted that reception of a system fault error message may be received at any time in method 400 and cause an immediate suspension of method 400. In embodiments of the present invention, if no system fault error condition exists, method 400 proceeds to step 410.

In step 410 of FIG. 4, an operation is performed to determine whether valid GPS information is being received. In embodiments of the present invention, a sensor integrity check may be automatically performed when power is initiated to ensure that the sensors are providing valid information. For example, a GPS sensor (e.g., position determining system 170) can be operating properly (e.g., no system fault), but can be providing useless information when the system is under trees, or experiencing bad position quality. It is noted that integrity checks for sensors other than position determining system may be performed at this time. If the GPS system (e.g., position determining system 170 of FIG. 1) is receiving valid information, method 400 proceeds to step 415.

In step 415 of FIG. 4, an operation is performed to determine whether system 100 is enabled with a cellular communication device. In embodiments of the present invention, some of the rovers in a network may not be equipped with a cellular communication device (e.g., 110 of FIG. 1) in order to reduce the cost of system comprising a plurality of rovers. In another embodiment, system 100 may be equipped with a cellular communication device, however, the device is disabled. This may be advantageous in situations in which it is desired to reduce the number of cellular connections maintained by a network in order to reduce costs. If it is determined that system 100 does have an enabled cellular communication device, method 400 proceeds to step 420. If it is determined that system 100 does not have an enabled cellular communication device, method 400 proceeds to step 421.

In step 420 of FIG. 4, an operation is performed to determine whether a cellular communication signal exists at the location of system 100. As described above, rovers are often used in construction sites or survey areas that are outside of a cellular communication network's coverage area. Thus, even if system 100 is configured with an enabled cellular communication device, it may not be able to communicate with a control center in order to send and receive data. In embodiments of the present invention, if a cellular communication signal is detected by system 100, method 400 proceeds to step 425. If no cellular communication signal is detected by system 100, method 400 proceeds to step 421.

In step 421 of FIG. 4, the rover without a cellular communication connection waits to receive a message that identifies which rover in the network will act as a gateway to the control center for RTK. Upon receiving this message, the IP address of the gateway is stored by the router. Method 400 then proceeds to step 435.

In step 425 of FIG. 4, a cellular communication connection is established with the control center for RTK. As described above, a cellular communication connection is typically used to communicate between a rover and a control center for RTK. This is advantageous because of the higher baud rate and distance that a cellular communications network provides. In the embodiment of FIG. 4, once a cellular communication connection is established between system 100 and a control center (e.g., 360 of FIG. 3), method 400 proceeds to step 430.

In step 430, the IP address of system 100 is broadcast using non-cellular communication device 120. In so doing, system 100 informs other rovers in range of the broadcast that it has established a cellular communication connection with control center 360 and will serve as a gateway to the control center for the network of rovers. This information is stored by the routers associated with each of the other rovers in the network. In embodiments of the present invention, method 400 then proceeds to step 435.

In step 435 of FIG. 4, GPS data is forwarded to a control center. In one embodiment, the GPS data may be generated by system 100 itself. In another embodiment, system 100 simply forwards GPS data for other rovers in the network which do not have a cellular connection with the control center. Thus, if a rover in the network (e.g., rover 2 of FIG. 3) does not have a direct cellular connection with the control center, the router 130B can determine which router (e.g., router 130 of system 100) in the network acts as a gateway to the control center and generate a message to system 100 indicating that data from rover 2 should be forwarded to the control center. Upon receiving this message, system 100 examines the data packets from rover 2, and forwards the data to the control center using cellular communication device 110. In embodiments of the present invention, method 400 then proceeds to step 440.

In step 440, a location-specific position correction from the control center is received by system 100. In embodiments of the present invention, this may be data destined for system 100 itself, or may be destined for another rover (e.g., rover 2) via system 100. If the data is destined for another rover, system 100 will forward the data using non-cellular communication device 120. In embodiments of the present invention, system 100 may have to re-format the data prior to broadcasting to the other rovers in the vicinity. The data packets will have the IP address of the receiving rover (e.g., rover 2) in the destination header. In embodiments of the present invention, all of the rovers which receive the broadcast data will examine the header of the data packets to determine if they are the destination. If they are not the destination, the rovers will either discard the data packets, or upon examining their own router tables, re-broadcast the data in order to forward it to the appropriate destination. Alternatively, if the receiving rover is the correct destination for the data, the rover will use that data to more precisely determine its geographic position.

Figure 5:
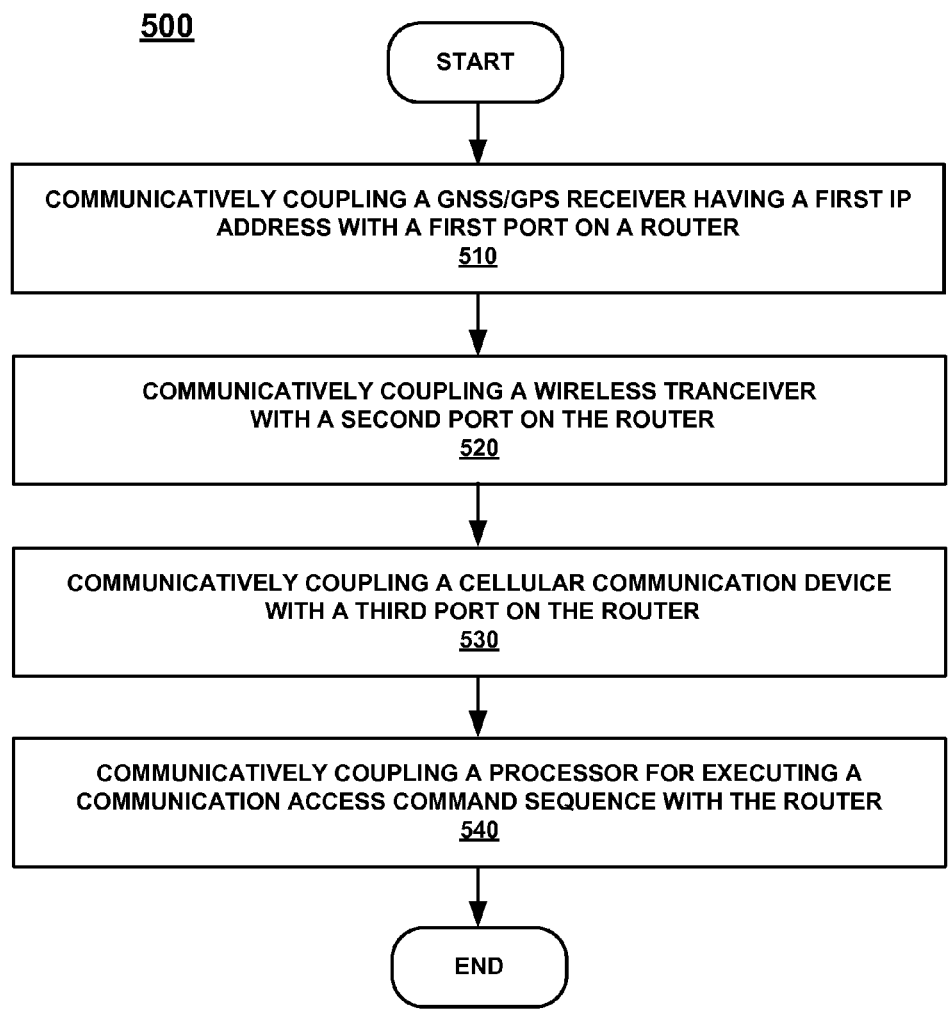
FIG. 5 is a flowchart of a method for requesting network-derived corrections from a mobile GNSS/GPS receiver in accordance with embodiments of the present invention.

FIG. 5 is a flowchart of a method 500 for requesting network-derived corrections from a mobile GNSS/GPS receiver in accordance with embodiments of the present invention. In step 510 of FIG. 5, a GNSS/GPS receiver having a first address is communicatively coupled with a first port on a router. As shown in FIG. 1, position determining system 170 is coupled with router 130 via bus 101.

In step 520 of FIG. 5, a wireless transceiver is communicatively coupled with a second port on the router. Referring again to FIG. 1, non-cellular communication device 120 is also coupled with router 130 via bus 101.

In step 530 of FIG. 5, a cellular communication device is communicatively coupled with a third port on the router. Referring again to FIG. 1, cellular communication device 110 is coupled with router 130 via bus 101.

In step 540 of FIG. 5, a processor for executing a communication access command sequence is communicatively coupled with the router. Referring again to FIG. 1, controller 150 is coupled with router 130 via bus 101. In embodiments of the present invention, controller 150 is for implementing a communication access command sequence for communicatively coupling a mobile GNSS/GPS receiver (e.g., rover 1 and/or rover 2 of FIG. 3 with a control center.

Figure 6:
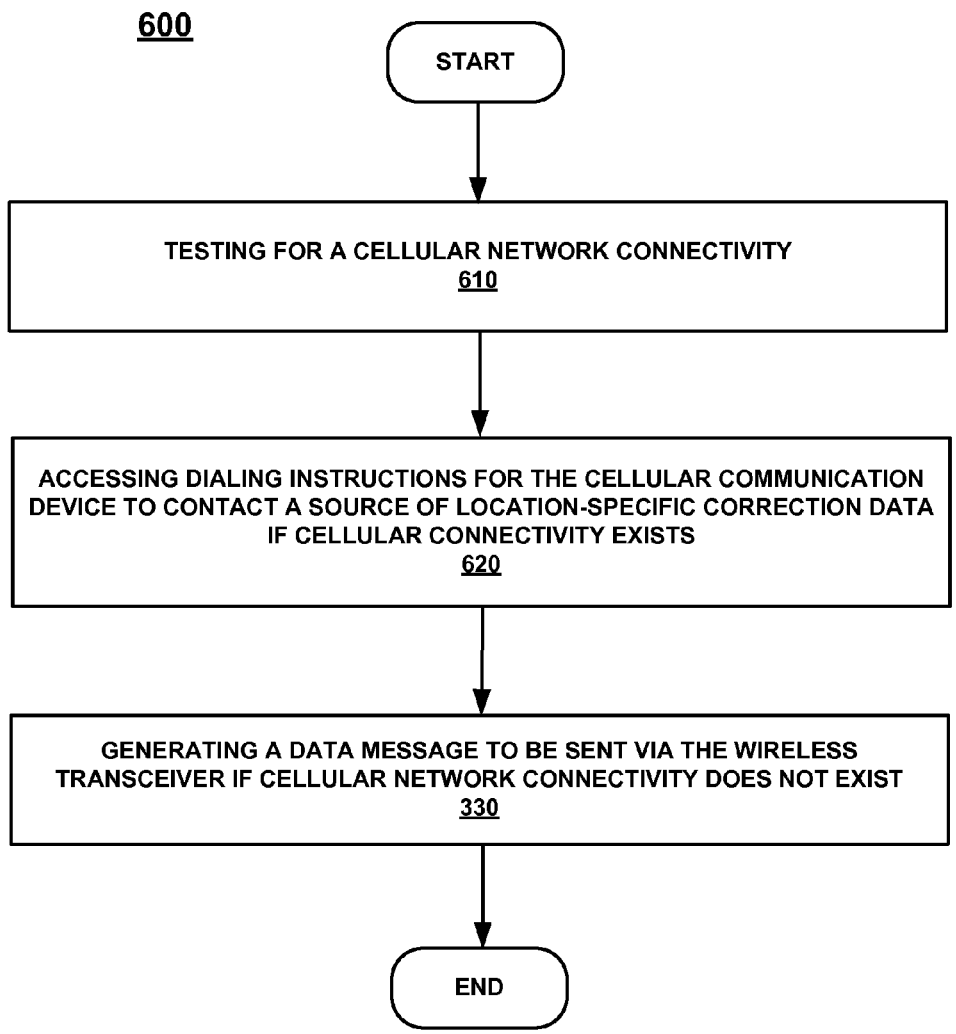
FIG. 6 is a flowchart of a communications access command sequence in accordance with embodiments of the present invention.

FIG. 6 is a flowchart of a communications access command sequence 600 in accordance with embodiments of the present invention. In embodiments of the present invention, sequence 600 may be performed by controller 150 as described above in step 540 of FIG. 5. In step 610 of FIG. 6, a test for cellular network connectivity is performed. In embodiments of the present invention, the GNSS/GPS receiver (e.g., rover 2) will first attempt to communicate with the control center for RTK (e.g., control center 360) using a cellular network connection.

In step 620 of FIG. 6, dialing instructions are accessed for the cellular communication device to contact a source of location-specific correction data if a cellular connection exists. In embodiments of the present invention, the dialing instructions may be accessed by controller 150, non-cellular communication device 120, router 130, etc. Upon establishing a cellular connection with the control center, the approximate location of the rover can be sent, along with a request for the modelled observables applicable to that location.

In step 630 of FIG. 6, a data message is generated which is to be sent via the wireless transceiver if cellular network connectivity does not exist. If a determination is made that cellular network connectivity does not exist between a source of a location-specific position correction and a mobile GNSS/GPS receiver, a data message is generated which will be sent via the wireless transceiver to a second mobile GNSS/GPS receiver which does have cellular network connectivity. In embodiments of the present invention, a plurality of mobile GNSS/GPS receivers may be used to relay the data message from the GNSS/GPS receiver which generated the data message and the GNSS/GPS receiver which has cellular network connectivity. The GNSS/GPS receiver which does have cellular network connectivity then forwards the data message to the source of location-specific correction data and also relays replies from the source of location-specific correction data back to the GNSS/GPS receiver which originated the data message.

Figure 7:
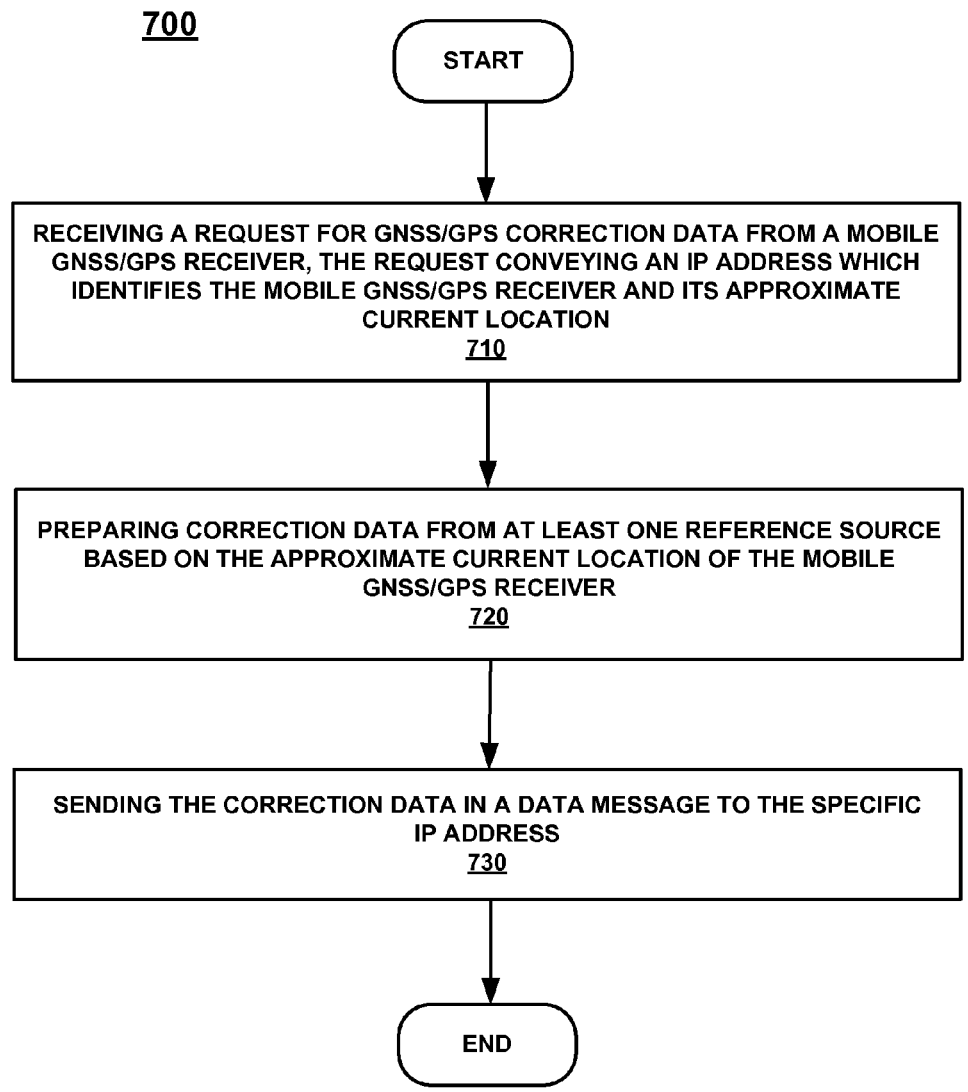
FIG. 7 is a flowchart of a method for delivering GNSS/GPS correction data from a source of GNSS/GPS correction data in accordance with embodiments of the present invention.

FIG. 7 is a flowchart of a method 700 for delivering GNSS/GPS correction data from a source of GNSS/GPS correction data in accordance with embodiments of the present invention. In step 710 of FIG. 7, a request for GNSS/GPS correction data is received from a mobile GNSS/GPS receiver. In embodiments of the present invention, the request comprises an IP address which identifies the mobile GNSS/GPS receiver and its approximate current location. As described above, in embodiments of the present invention, a rover (e.g., rover 1 of FIG. 3) which has established a cellular communication connection with a control center (e.g., 360 of FIG. 3) may act as a gateway for other rovers (e.g., rovers 2 and rover N of FIG. 3) which do not have a cellular communication connection with the control center. Thus, upon determining that it does not have a cellular connection with control center 360, the controller of rover 2 causes router 130B to send a request for a location-specific position correction, as well as the IP address of rover 2, to rover 1. The request further comprises information that informs rover 1 that the data is intended for control center 360.

In step 720 of FIG. 7, correction data is prepared from at least one reference source based on the approximate current location of the mobile GNSS/GPS receiver. Upon receiving the request, control center 360 creates a set of correction models that will provide rover 2 with the means to estimate ionospheric path delay, as well as other error contributions, from satellites at the current instant in time for the location at which rover 2 is situated.

In step 730 of FIG. 7, the correction data is sent in a data message to the specific IP address provided in step 710. In embodiments of the present invention, the correction models created by control center 360 generates a reply which it sends to rover 2 via the cellular network connection established with rover 1. Upon receiving the reply, rover 1 examines the IP destination header data to determine which mobile GNSS/GPS receiver the correction model data is destined. Upon determining that the correction model data is destined for rover 2, rover 1 broadcasts the correction model data using non-cellular communication device 120. In embodiments of the present invention, one or more additional mobile GNSS/GPS receivers may be utilized to relay communications between rover 1 and rover 2.

Figure 8:
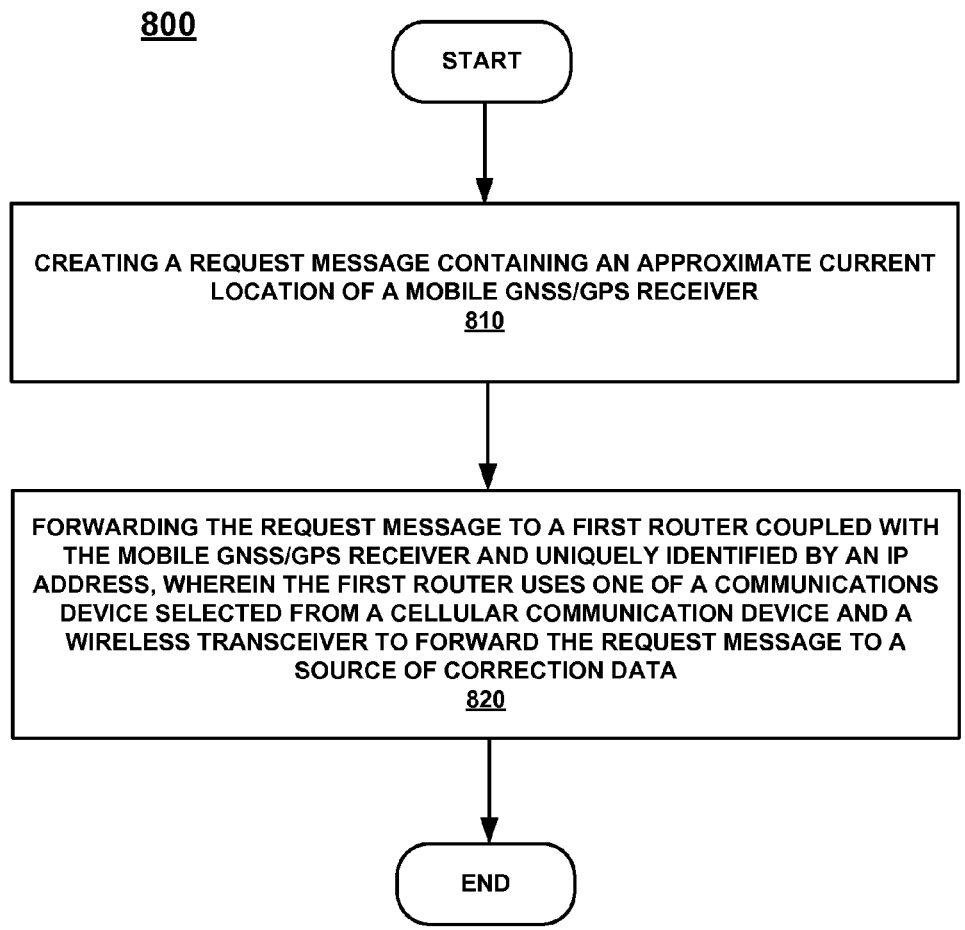
FIG. 8 is a flowchart of a method requesting GNSS/GPS correction data for use by a mobile GNSS/GPS receiver in accordance with embodiments of the present invention.

FIG. 8 is a flowchart of a method 800 requesting GNSS/GPS correction data for use by a mobile GNSS/GPS receiver in accordance with embodiments of the present invention. In step 810 of FIG. 8, a request message is created containing an approximate current location of a mobile GNSS/GPS receiver. As described above, in embodiments of the present invention, in networked RTK systems, a mobile receiver determines its approximate location and generates a request for the modelled observables applicable for the approximate location at which the receiver is located. In embodiments of the present invention. the request further comprises an IP address which uniquely identifies the receiver.

In step 820 of FIG. 8, the request message is forwarded to a first router coupled with the mobile GNSS/GPS receiver and uniquely identified by an IP address. In embodiments of the present invention, the first router uses one of communications device selected from a cellular communications device and a wireless transceiver to forward the request message to a source of correction data. If a cellular network connection exists between the mobile GNSS/GPS receiver and the control center, the mobile GNSS/GPS receiver will send the request message using the cellular communications device. If a cellular network connection does not exist between the mobile GNSS/GPS receiver, the request message is sent using the wireless transceiver. More specifically, the wireless transceiver is used to send the request message to a mobile GNSS/GPS receiver which does have a cellular network connectivity with the source of correction data.

Figure 9:
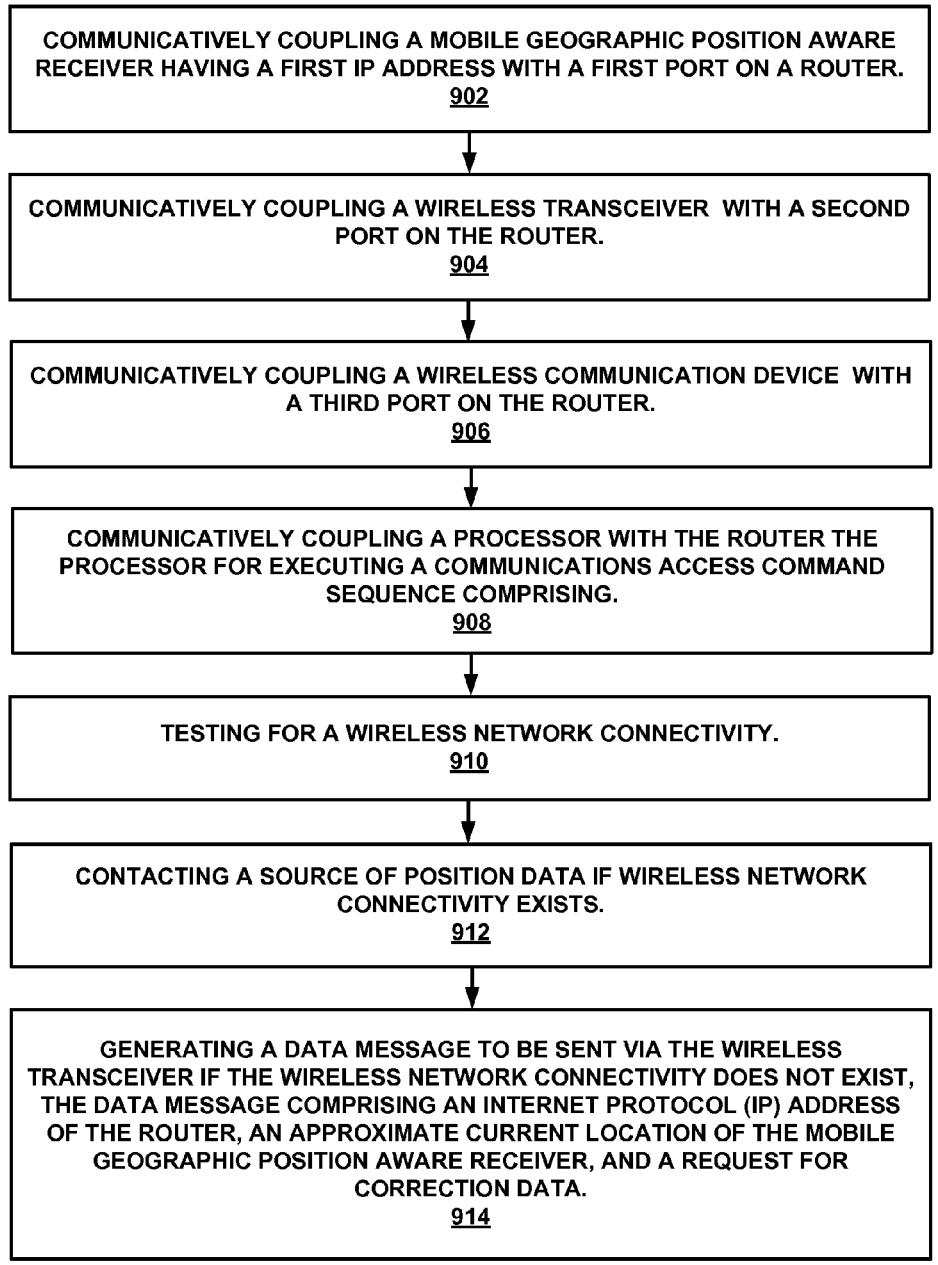
FIG. 9 is a flowchart of a method for requesting network-derived position data from a mobile geographic position aware receiver in accordance with embodiments of the present invention.

FIG. 9 is a flowchart of a method 900 for requesting network-derived position data from a mobile geographic position aware receiver in accordance with embodiments of the present invention. In step 810 of FIG. 8, a request message is created containing an approximate current location of a mobile GNSS/GPS receiver. At step 902, a mobile geographic position aware receiver having a first IP address is communicatively coupled with a first port on a router. At step 904, a wireless transceiver is communicatively coupled with a second port on the router. At step 906, a wireless communication device is communicatively coupled with a third port on the router. At step 908, a processor is communicatively coupled with the router the processor for executing a communications access command sequence comprising. At step 910, a wireless network is tested for connectivity. At step 912, a source of position data is contacted if wireless network connectivity exists. At step 914, a data message to be sent via the wireless transceiver is generated if the wireless network connectivity does not exist, the data message comprising an Internet Protocol (IP) address of the router, an approximate current location of the mobile geographic position aware receiver, and a request for correction data.

FIG. 10 is a flowchart of a method 1000 for delivering location-specific data from a source of location-specific data in accordance with embodiments of the present invention. In step 810 of FIG. 8, a request message is created containing an approximate current location of a mobile GNSS/GPS receiver. At step 1002, a request for the location-specific data is received from a mobile geographic position aware receiver, the request conveying an Internet Protocol (IP) address which identifies a first router associated with the mobile geographic position aware receiver and an approximate current location of the mobile geographic position aware receiver. At step 1004, location-specific data is prepared from at least one reference source based on the approximate current location of the mobile geographic position aware receiver. At step 1006, the location-specific data is sent in a data message to the specific IP address.

The preferred embodiment of the present invention, a method and system for communicating information to a roving positioning device, is thus described. While the present invention has been described in particular embodiments, it should be appreciated that the present invention should not be construed as limited by such embodiments, but rather construed according to the following claims.

What is claimed is:

1. A method for requesting network-derived location-specific correction data for a mobile geographic position aware receiver, said method comprising:

communicatively coupling a mobile geographic position aware receiver having a first Internet Protocol (IP) address with a first port on a router;

communicatively coupling a wireless transceiver with a second port on said router;

communicatively coupling a wireless communication device with a third port on said router, wherein said wireless communication device and said wireless transceiver employ differing wireless communication protocols; and communicatively coupling a processor with said router said processor for executing a communications access command sequence comprising:

testing for a wireless network connectivity of said wireless communication device;

in response to determining via said testing that said wireless connectivity exists, contacting a correction data source using said wireless communication device to acquire a set of network derived location-specific correction data based on an approximate current location of said mobile geographic position aware receiver; and in response to determining via said testing that said wireless connectivity does not exist, generating a data message to be sent via said wireless transceiver, said data message comprising an IP address of said router, said approximate current location of said mobile geographic position aware receiver, and a request for network-derived location-specific correction data.

2. The method as recited in claim 1, wherein said executing a communications command action sequence further comprises:

automatically identifying a second mobile geographic position aware receiver which does have a wireless communication network connection with said correction data source and sending said data message via said wireless transceiver to a second router associated with said second mobile geographic position aware receiver.

3. The method as recited in claim 2, wherein said executing a communications command action sequence further comprises:

transmitting said data message to said correction data source via said wireless communications network using a second wireless communications device coupled with said second router;

in response to said data message, receiving at said second router, said network-derived location-specific correction data, said network-derived location-specific correction data received via said wireless communication network using said second wireless device;

sending said network-derived location-specific correction data to said wireless transceiver; and routing said network-derived location-specific correction data with said router to said mobile geographic position aware receiver, said mobile geographic position aware receiver configured to utilize network location-specific correction data to more precisely determine position.

4. The method as recited in claim 1, wherein said network-derived location-specific correction data comprises:

network Real Time Kinematic (RTK) corrections for a region encompassing said approximate current location of said mobile geographic position aware receiver.

5. The method as recited in claim 1, wherein said network-derived location-specific correction data comprises:

modeled observables applicable for said approximate current location of said mobile geographic position aware receiver.

6. The method as recited in claim 1, wherein said network-derived location-specific correction data comprises:

location-specific correction data derived from reference station data which are processed by said correction data source.

7. The method as recited in claim 1, wherein said mobile geographic position aware receiver comprises:

a global positioning system (GPS) receiver.

8. The method as recited in claim 1, wherein said mobile geographic position aware receiver comprises:

a global navigation satellite system (GNSS) receiver.

9. The method as recited in claim 1, wherein said wireless transceiver utilizes a non-cellular wireless communication protocol.

10. The method as recited in claim 9, wherein said wireless transceiver comprises a two-way radio.

11. The method as recited in claim 9, wherein said wireless transceiver utilizes an unlicensed radio communication operating in the 900 megahertz frequency band.

12. The method as recited in claim 9, wherein said wireless transceiver utilizes an unlicensed radio communication operating in the 2.4 gigahertz frequency band.

13. The method as recited in claim 9, wherein said wireless transceiver utilizes an unlicensed radio communication operating in the 5.8 gigahertz frequency band.

* * * * *